May 13, 1941.  C. C. LEADER  2,242,007
DYNAMOELECTRIC MACHINE
Filed Oct. 25, 1939
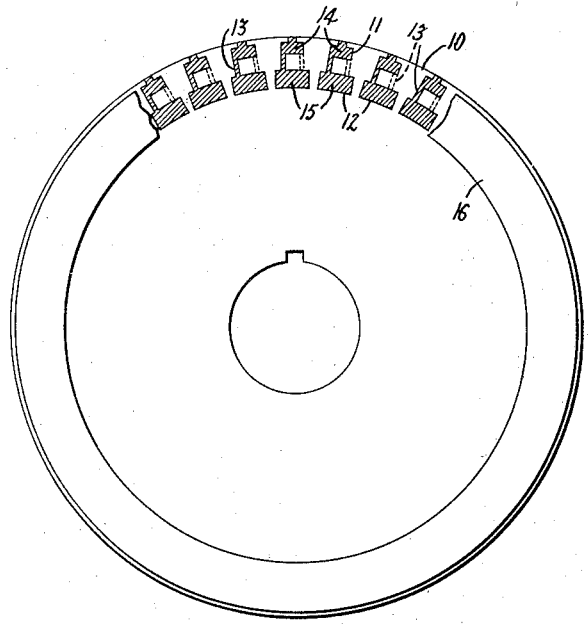
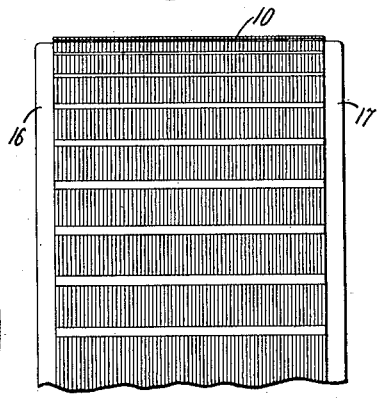
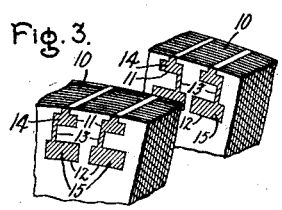
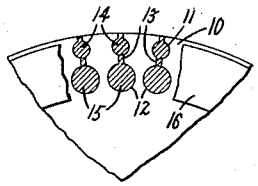
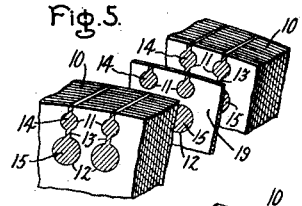
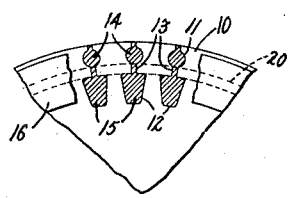
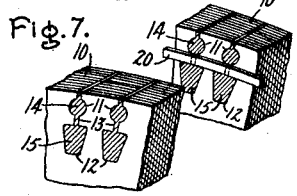
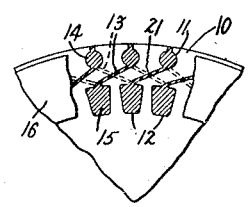
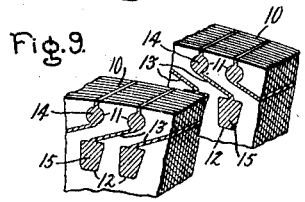
Inventor:
Charles C. Leader:
by Harry E. Dunham
His Attorney.

Patented May 13, 1941

2,242,007

UNITED STATES PATENT OFFICE 2,242,007

DYNAMOELECTRIC MACHINE

Charles C. Leader, Schenectady, N. Y., assignor to General Electric Company, a corporation of New York Application October 25, 1939, Serial No. 301,200

19 Claims. (Cl. 172—120)

My invention relates to improvements in dynamoelectric machines, and particularly to the type of machine utilizing a multiple section winding in one of the elements thereof.

An object of my invention is to provide a dynamoelectric machine having an improved multiple section winding.

Another object of my invention is to provide an improved dynamoelectric machine having a multiple section winding slot wherein the main sections of the winding slot are continuous longitudinally of the machine and the interconnecting section interconnecting the main winding slot sections is not continuous longitudinally of the machine.

Further objects and advantages of my invention will become apparent, and my invention will be better understood from the following description referring to the accompanying drawing, and the features of novelty which characterize my invention will be pointed out with particularity in the claims annexed to and forming part of this specification.

In the drawing, Fig. 1 is an end view of a part of a dynamoelectric machine rotatable element embodying my invention, partly broken away to illustrate the relative arrangement of the winding; Fig. 2 is a partial side view of the rotatable member illustrated in Fig. 1; Fig. 3 is an exploded perspective view of a part of the rotatable member of a dynamoelectric machine illustrating a modification of the arrangement shown in Fig. 1; Fig. 4 is an end view of a part of the rotatable member of a dynamoelectric machine, partly broken away to illustrate another modification of my invention; Fig. 5 is an exploded perspective view of a part of the arrangement shown in Fig. 4; Fig. 6 is an end view of a part of a rotatable member of a dynamoelectric machine partly broken away to illustrate a further modification of my invention; Fig. 7 is an exploded perspective view of a part of the modification of my invention shown in Fig. 6; Fig. 8 is an end view of a part of the rotatable member of a dynamoelectric machine partly broken away to illustrate a still further modification of my invention; and Fig. 9 is an exploded perspective view of a part of a dynamoelectric machine to illustrate the arrangement shown in Fig. 8.

Referring to the drawing, I have shown in Fig. 1 the rotatable member of a dynamoelectric machine provided with a core formed of a plurality of laminations 10 of magnetic material having a plurality of winding slots arranged about the outer periphery thereof. These winding slots are of the multiple section type and include an outer section 11 of relatively small area and an inner section 12 of relatively larger area than the outer section 11. A small relatively narrow interconnecting section or neck 13 connects together the outer section 11 and the inner section 12 of the winding slot, and is arranged offset to one side of the radial center of the winding slot. The laminations 10 are assembled with the inner and outer sections of the winding slots in registry, so as to provide continuous inner and outer slot sections longitudinally through the core. I have found it desirable to interrupt the longitudinal continuity through the core of the interconnecting section 13, and in the arrangement shown in Fig. 1 this is obtained by reversing at least one of the laminations with respect to the remaining laminations in the core, so that the interconnecting section 13 is arranged on the opposite side of the radial center of the slot sections 11 and 12 from that of the remaining laminations. The position of the interconnecting section 13 of the reversely arranged lamination is shown in dotted lines in Fig. 1. In certain cases the operation of the machine may be further improved by reversing a plurality of laminations at spaced apart intervals longitudinally through the core to provide a plurality of longitudinally discontinuous interconnecting sections 13. A cast winding is formed in the core and is made to conform to the respective slot sections thereof, so that the small outer conductor sections provide a relatively high resistance element 14, and the larger inner conductor section of each slot provides a relatively low resistance conductor element 15. This cast winding may be made of any suitable electrically conductive material, such as aluminum or copper, and the ends of the conductors in the core slots are connected together by short-circuiting end rings 16 and 17 to complete the winding. The outer relatively high resistance conductor element 14 also may be made of a material having a higher electrical resistance than the inner low resistance conductor element 15. This construction provides a rotor which has the starting characteristics of a true double squirrel cage winding; that is, of one in which there is no conductor connecting the inner and outer sections of a multiple conductor winding, and gives a desired high starting torque which is obtainable with this type winding, and also provides a higher maximum torque and lower full load slip than the true double squirrel cage winding, and is comparable to that obtainable in a single section winding slot machine. This may be explained by the fact that during starting of such a machine the current in the rotor is substantially at line frequency, and no current flows through the interconnecting relatively narrow small portion, since it is discontinuous longitudinally through the rotor. Under running conditions, in the range from maximum torque to synchronous speed the frequency of the rotor currents is relatively low, and the current is distributed substantially uniformly throughout the entire section of conductor in the winding slots, resulting in improved torque and slip characteristics.

Another modification of the arrangement shown in Fig. 1 is illustrated in Fig. 3, wherein a plurality of laminations is arranged in the same order to provide a continuous section longitudinally through the group of laminations for the interconnecting section between the inner and outer sections of the winding slot. A plurality of these groups of laminations is arranged in alternately reversed relation, so that the relatively narrow interconnecting section or neck 13 extends on the opposite side of the radial center of the winding slots in the different adjacent groups of laminations. With such an arrangement, the interconnecting section 13 is discontinuous and broken longitudinally through the core of the machine. Such an arrangement provides substantially the same operating characteristics as those illustrated in Fig. 1.

Figs. 4 and 5 illustrate another modification of my invention, wherein a rotatable member for a dynamoelectric machine is provided with a multiple section winding slot which includes an outer relatively small slot section 11 and an inner relatively larger section 12. In this arrangement, certain of the laminations are provided with slots wherein the inner and outer conductor slot sections are interconnected by a relatively narrow section or neck 13, and others of the laminations are formed with inner and outer conductor slot sections which are not interconnected but are separated by a portion 19 of the lamination. The laminations are assembled with the outer conductor sections 11 and the inner conductor sections 12 in registry to provide continuous conductor slot sections longitudinally through the core, and at least one lamination having no connecting slot section between the outer and inner conductor sections is arranged intermediate the ends of the assembled laminations. Preferably, I arrange the laminations in a plurality of groups having interconnecting slot sections between the inner and outer conductor slot sections, and provide a lamination without an interconnecting section between the inner and outer conductor slot sections intermediate each group. In this manner the interconnecting slot section between the inner and outer conductor sections is discontinuous longitudinally through the core of the machine element. As in the arrangement shown in Fig. 1, I provide a cast squirrel cage winding in these winding slots to conform to the respective sections thereof, formed of any suitable electrically conductive material, such as aluminum or copper. The winding thus formed includes outer relatively high resistance small conductor sections 14 and inner relatively low resistance large conductor sections 15. The ends of these conductor sections are interconnected by short-circuiting end rings 16 to provide a complete winding. The operating characteristics of this construction are very similar to those of the machine element shown in Fig. 1.

Figs. 6 and 7 illustrate a further modification of my invention, wherein a rotatable member for a dynamoelectric machine is provided with a core of magnetic material formed of laminations 10, all of which are provided with multiple section winding slots. Each of these slots includes an outer relatively small section 11 and an inner relatively large section 12 which are interconnected by a relatively narrow section or neck 13. The laminations are assembled with the outer conductor sections 11 and the inner conductor sections 12 in registry to provide continuous conductor slot sections longitudinally through the core. Intermediate the ends of the core I arrange a substantially non-magnetic, electrically insulating or high resistance element in the form of a circumferentially extending narrow ring or strip 20, so as to interrupt the continuity longitudinally through the core of the narrow interconnecting slot section 13. Preferably, I arrange the laminations in a plurality of groups between which non-magnetic elements 20 are arranged over the interconnecting slot section 13 as shown in Fig. 7. A cast squirrel cage winding is formed in these winding slots to conform to the respective sections thereof, and is made of any suitable electrically conductive material, such as aluminum or copper. This provides an outer conductor section 14 of relatively small section and high resistance, and an inner relatively large conductor section 15 of relatively low resistance. The outer conductor sections 14 also may be made of a higher resistance material than the inner conductor sections 15 to increase the starting torque of the machine. In order to complete the winding, short-circuiting end rings 16 connect together the ends of the conductors at each end of the winding. The operating characteristics of this construction are very similar to those of the machine shown in Fig. 1.

In Figs. 8 and 9 I have shown a still further modification of my invention, wherein the magnetic core element of the rotatable member of a dynamoelectric machine is formed of laminations 10 provided with multiple section winding slots including an outer relatively small section 11 and an inner relatively larger section 12 which are radially displaced out of alignment with each other and are interconnected by an angularly extending relatively narrow section or neck 13. In this arrangement, the laminations may be assembled with all of the inner and outer slot sections in axial registry to provide continuous slot sections longitudinally through the core of the machine. Intermediate the ends of the core at least one of the laminations is reversed from the remaining laminations, so that the radially offset arrangement of the inner and outer conductor sections is in the opposite direction from the radial center of the slots from the offset of these sections in remaining laminations. The arrangement of the interconnecting narrow slot section 13 of the reversed lamination is shown in dotted lines in Fig. 8. Preferably, I arrange the laminations in a plurality of groups having interconnecting slot sections extending in the same direction in each group of laminations, and provide a reversed lamination between each of these groups, so as to obtain a discontinuous interconnecting slot section 13 longitudinally through the core. This same result may be obtained by forming groups of similarly arranged laminations and reversing the arrangement of alternate groups of laminations, as shown in Fig. 9. In each of these arrangements, a relatively small conductor slot section 21 is formed intermediate the inner and outer conductor slot sections 11 and 12 by the overlapping of the sections 13, and this slot section 21 extends continuously longitudinally through the core. This section 21 is smaller than either of the sections 11 and 12, as is shown in Fig. 8. A multiple section cast squirrel cage winding is formed in these slots to conform to the various sections thereof, and is made of any suitable electrically conductive material. The winding thus formed includes an outer relatively small section conductor 14 which is of higher resistance and a relatively larger inner conductor section 15 of a correspondingly lower resistance. In certain instances, the outer conductor section 14 may be formed of a higher resistance material than the inner conductor section 15. The winding is completed by short-circuiting end rings 16 which connect together the ends of the conductor sections 14, 15, and 21. In an arrangement such as that shown in Fig. 9, each relatively low resistance large conductor section 15 is connected to two relatively high resistance slot section conductors 14 by the interconnecting narrow slot sections 13. The operating characteristics of this construction are slightly better than those of the other modifications disclosed in this application. This radially offset construction is more fully explained and claimed in my copending application Serial No. 301,198, filed October 25, 1939, and assigned to the same assignee as this application.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A member for a dynamoelectric machine including an element of magnetic material with winding slots formed as multiple section conductor slots having a relatively small outer conductor slot section and a relatively large inner conductor slot section with a relatively narrow slot section connecting together said inner and outer slot sections, said slots providing continuous inner and outer conductor slot sections longitudinally through said element, means for substantially interrupting the continuity longitudinally through said element of said relatively narrow slot connecting section of each slot, a winding having conductors in said slots arranged to conform to the respective sections thereof, and means for connecting together said conductors to complete said winding.

2. A member for a dynamoelectric machine including an element of magnetic material with winding slots formed as multiple section conductor slots having a relatively small outer conductor slot section and a relatively large inner conductor slot section with a relatively narrow slot section connecting together said inner and outer sections, said slots providing continuous inner and outer conductor slot sections longitudinally through said element, said relatively narrow slot connecting section being substantially discontinuous longitudinally through said element, a winding having conductors in said slots arranged to conform to the respective sections thereof, and means for connecting together said conductors to complete said winding.

3. A member for a dynamoelectric machine including a core, said core having laminations with winding slots substantially all of which are formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including the construction of said slots and arrangement of said laminations for substantially interrupting the continuity longitudinally through said core of said relatively narrow slot connecting section of each slot, a winding having conductors in said slots arranged to conform to the respective sections thereof, and means for connecting together said conductors to complete said winding.

4. A member for a dynamoelectric machine including a core, said core having laminations with winding slots substantially all of which are formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including the construction of said narrow connecting slot section of at least one lamination for substantially interrupting the continuity longitudinally through said core of said relatively narrow slot connecting section of each slot, a winding having conductors in said slots arranged to conform to the respective sections thereof, and means for connecting together said conductors to complete said winding.

5. A member for a dynamoelectric machine including a core, said core having laminations with winding slots substantially all of which are formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including the construction of said narrow connecting slot sections of said laminations for substantially interrupting the continuity longitudinally through said core of said relatively narrow slot connecting section of each slot, a winding having conductors in said slots arranged to conform to the respective sections thereof, and means for connecting together said conductors to complete said winding.

6. A member for a dynamoelectric machine including a core, said core having laminations with winding slots substantially all of which are formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including the construction and arrangement of at least one of said laminations for substantially interrupting the continuity longitudinally through said core of said relatively narrow slot connecting section of each slot, a winding having conductors in said slots arranged to conform to the respective sections thereof, and means for connecting together said conductors to complete said winding.

7. A member for a dynamoelectric machine including a core, said core having laminations with winding slots substantially all of which are formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including the construction of said narrow connecting slot section and the arrangement of said laminations in groups for substantially interrupting the continuity longitudinally through said core of said relatively narrow slot connecting section of each slot, a winding having conductors in said slots arranged to conform to the respective sections thereof, and means for connecting together said conductors to complete said winding.

8. A member for a dynamoelectric machine including a core, said core having laminations with winding slots substantially all of which are formed as multiple section conductor slots having a relatively small outer conductor section and a relatively large inner conductor section with a relatively narrow slot section connecting together said inner and outer sections, said laminations being arranged to provide continuous inner and outer conductor sections longitudinally through said core, means including the construction and arrangement of said lamination slots for substantially interrupting the continuity longitudinally through said core of said relatively narrow slot connecting section of each slot, a winding having conductors in said slots arranged to conform to the respective sections thereof, and means for connecting together said conductors to complete said winding.

9. A member for a dynamoelectric machine including a core, said core having laminations with winding slots formed as multiple section conductor slots having a relatively small outer conductor section and a relatively large inner conductor section, a relatively narrow slot section connecting together said inner and outer sections and extending therebetween in a direction other than radially through the center of said outer slot section, said laminations being arranged with at least one of said connecting slot sections extending to the opposite side of the radial center of said outer slot sections from the side thereof in the laminations on one side of said one lamination and providing continuous inner conductor sections and substantially discontinuous connecting slot sections in each slot longitudinally through said core, a winding having conductors in said slots arranged to conform to the respective sections thereof, and means for connecting together said conductors to complete said winding.

10. A member for a dynamoelectric machine including a core, said core having laminations with winding slots formed as multiple section conductor slots having a relatively small outer conductor section and a relatively large inner conductor section, a relatively narrow slot section connecting together said inner and outer sections and extending therebetween in a direction other than radially through the center of said outer slot section, said laminations being arranged with said connecting slot sections extending to opposite sides of the radial center of said outer slot sections in different groups of laminations and providing continuous inner and outer conductor sections and substantially discontinuous connecting slot sections for each slot longitudinally through said core, a winding having conductors in said slots arranged to conform to the respective sections thereof, and means for connecting together said conductors to complete said winding.

11. A member for a dynamoelectric machine including a core, said core having laminations with winding slots formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including a non-magnetic element arranged between certain of said laminations for interrupting the continuity longitudinally through said core of said relatively narrow slot connecting section of each slot, a winding having conductors in said slots arranged to conform to the respective sections thereof, and means for connecting together said conductors to complete said winding.

12. A member for a dynamoelectric machine including an element of magnetic material with winding slots formed as multiple section conductor slots having a relatively small outer conductor slot section and a relatively larger inner conductor slot section with a relatively narrow slot section connecting together said inner and outer sections, said slots being arranged to provide continuous inner and outer conductor slot sections longitudinally through said core, means arranged between the ends of said slots for interrupting the continuity longitudinally through said element of said relatively narrow slot connecting section of each slot, a winding having conductors in said slots arranged to conform to the respective sections thereof, and means for connecting together said conductors to complete said windings.

13. A member for a dynamoelectric machine including a core, said core having laminations with winding slots formed as multiple section conductor slots having a relatively small outer conductor slot section and a relatively large inner conductor slot section with a relatively narrow slot section connecting together said inner and outer sections, said laminations being arranged to provide continuous inner and outer conductor slot sections longitudinally through said core, means including a plurality of elements arranged between different groups of said laminations for providing a plurality of longitudinally interrupted relatively narrow slot connecting sections for each slot longitudinally through said core, a winding having conductors in said slots arranged to conform to the respective sections thereof, and means for connecting together said conductors to complete said winding.

14. A member for a dynamoelectric machine including a core, said core having laminations with winding slots formed as multiple section conductor slots having a relatively small outer conductor section and a relatively large inner conductor section with a relatively narrow slot section connecting together said inner and outer sections, other laminations having a relatively small outer conductor section slot and a relatively large inner conductor section slot disconnected from said outer slot and corresponding substantially to said inner and outer slot sections of said first-mentioned laminations, said laminations being arranged to provide continuous inner and outer conductor slot sections longitudinally through said core, means including said other laminations arranged between said first-mentioned laminations for substantially interrupting the continuity longitudinally through said core of said relatively narrow slot connection of each slot, a winding having conductors in said slots arranged to conform to the respective sections thereof, and means for connecting together said conductors to complete said winding.

15. A member for a dynamoelectric machine including a core, said core having laminations with winding slots formed as multiple section conductor slots having a relatively small outer conductor section and a relatively large inner conductor section with a relatively narrow slot section connecting together said inner and outer sections, other laminations having a relatively small outer conductor section slot and a relatively large inner conductor section slot disconnected from said outer slot and corresponding substantially to said inner and outer slot sections of said first-mentioned laminations, said laminations being arranged to provide continuous inner and outer conductor sections longitudinally through said core, means including a plurality of said other laminations arranged at spaced intervals between groups of said first-mentioned laminations for providing a plurality of substantially disconnected relatively narrow slot connecting sections for each slot longitudinally through said core, a winding having conductors in said slots arranged to conform to the respective sections thereof, and means for connecting together said conductors to complete said winding.

16. A member for a dynamoelectric machine including an element of magnetic material comprising laminations having winding slots formed therein, each of said winding slots being formed as a multiple section conductor slot including a relatively small conductor section and a relatively large conductor section with a relatively narrow connecting slot section extending therebetween, said small conductor section and said large conductor section of each slot being arranged radially displaced out of alignment, said laminations being arranged with the radial alignment displacement of said large conductor sections with respect to said small conductor sections of said winding slots displaced in opposite directions in different groups of laminations and providing continuous large conductor sections and substantially discontinuous connecting slot sections longitudinally through said element, a winding having conductors in said slots arranged to conform substantially to the respective sections thereof, and means for connecting together said conductors to complete said winding.

17. A member for a dynamoelectric machine including an element of magnetic material comprising laminations having winding slots formed therein, each of said winding slots being formed as a multiple section conductor slot including a relatively small conductor section and a relatively large conductor section with a relatively narrow connecting slot section extending therebetween, said small conductor section and said large conductor section of each slot being arranged radially displaced out of alignment, at least one of said laminations being arranged with the radial displacement of said large conductor sections with respect to said small conductor sections of said winding slots displaced in the opposite direction from the displacement thereof in the laminations on one side thereof and providing continuous large conductor sections and substantially discontinuous connecting slot sections longitudinally through said element, a winding having conductors in said slots arranged to conform substantially to the respective sections thereof, and means for connecting together said conductors to complete said winding.

18. A member for a dynamoelectric machine including an element of magnetic material comprising laminations having winding slots formed therein, each of said winding slots being formed as a multiple section conductor slot including a relatively small conductor section and a relatively large conductor section with a relatively narrow connecting slot section extending therebetween, said small conductor section and said large conductor section of each slot being arranged radially displaced out of alignment, said laminations being arranged with the radial displacement of said large conductor sections with respect to said small conductor sections of said winding slots displaced in opposite directions in different laminations and providing continuous large conductor sections longitudinally through said element, each of said continuous large conductor sections thereby being connected to a plurality of small conductor sections longitudinally through said core and providing a continuous connection between a plurality of said slots around the periphery of said element, a winding having conductors in said slots arranged to conform substantially to the respective sections thereof, and means for connecting together said conductors to complete said winding.

19. A member for a dynamoelectric machine including an element of magnetic material comprising laminations having winding slots formed therein, each of said winding slots being formed as a multiple section conductor slot including a relatively small conductor section and a relatively large conductor section with a relatively narrow connecting slot section extending therebetween, said small conductor section and said large conductor section of each slot being arranged radially displaced out of alignment, said laminations being arranged with the radial displacement of said large conductor sections with respect to said small conductor sections of said winding slots displaced in opposite directions in different groups of laminations and providing continuous large conductor sections and discontinuous connecting slot sections longitudinally through said element, said arrangement of said radial displacement of said large conductor sections with respect to said small conductor sections providing an overlapping of said connecting slot sections of said different groups of laminations and forming a continuous conductor section longitudinally through said element of relatively smaller section than said small conductor section, a winding having conductors in said slots arranged to conform substantially to the respective sections thereof, and means for connecting together said conductors to complete said winding.

CHARLES C. LEADER.